Oct. 6, 1970  J. MASEFIELD ET AL  3,532,888
PNEUMATIC IRRADIATOR WITH VARIABLE DOSE RATE
Original Filed Nov. 19, 1963  6 Sheets-Sheet 1

INVENTORS
JOHN MASEFIELD
FRANK GRAHAM RICE
MURRAY BARNES ANDERSON
ERIC KENNETH CURNOW

BY Cushman, Darby & Cushman
ATTORNEYS

Oct. 6, 1970  J. MASEFIELD ET AL  3,532,888
PNEUMATIC IRRADIATOR WITH VARIABLE DOSE RATE
Original Filed Nov. 19, 1963  6 Sheets-Sheet 2

INVENTORS
JOHN MASEFIELD
FRANK GRAHAM RICE
MURRAY BARNES ANDERSON
ERIC KENNETH CURNOW

By
Cushman, Darby & Cushman
ATTORNEYS

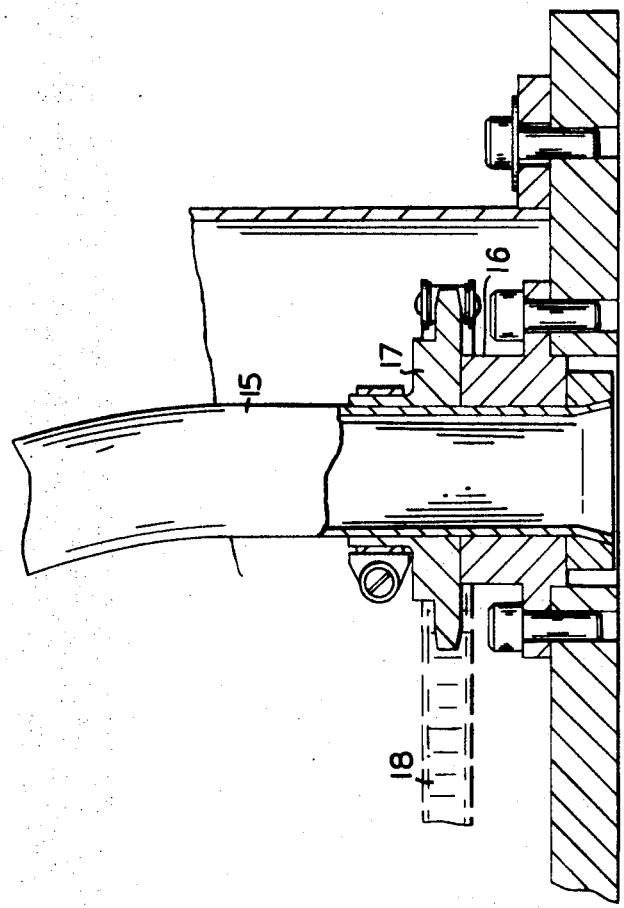

Oct. 6, 1970      J. MASEFIELD ET AL      3,532,888

PNEUMATIC IRRADIATOR WITH VARIABLE DOSE RATE

Original Filed Nov. 19, 1963      6 Sheets-Sheet 5

INVENTORS
JOHN MASEFIELD
FRANK GRAHAM RICE
MURRAY BARNES ANDERSON
ERIC KENNETH CURNOW

By

Cushman, Darby & Cushman
ATTORNEYS

INVENTORS
JOHN MASEFIELD
FRANK GRAHAM RICE
MURRAY BARNES ANDERSON
ERIC KENNETH CURNOW

United States Patent Office 3,532,888
Patented Oct. 6, 1970

3,532,888
PNEUMATIC IRRADIATOR WITH
VARIABLE DOSE RATE
John Masefield, Frank Graham Rice, Murray B. Anderson, and Eric K. Curnow, Ottawa, Ontario, Canada, assignors to Atomic Energy of Canada Limited, Ottawa, Ontario, Canada
Continuation of application Ser. No. 324,815, Nov. 19, 1963. This application June 8, 1967, Ser. No. 644,736
Claims priority, application Canada, Sept. 16, 1963, 884,602
Int. Cl. G21h 5/00
U.S. Cl. 250—106                                                  19 Claims

ABSTRACT OF THE DISCLOSURE

There is provided a technique and apparatus for the high energy irradiation of products whereby the dose rate may be conveniently varied by remote control and whereby the source of radio activity may be remotely moved from the irradiating position into a storage position and wherein the storage position contains sufficient biological shielding such that once the source has been moved to the storage position the whole of the equipment may be safely approached by personnel.

---

This application is a continuation of Ser. No. 324,815, filed Nov. 19, 1963, now abandoned.

This invention relates to an apparatus and method for the irradiating of samples with high energy radiation. It has particular reference to an apparatus, in which the strength of the irradiating field may be varied, in which the source of irradiation may be brought to an irradiating position when required and which is safe when not in use. This irradiator makes use of basic principle described by Eve and Grimmett in "Nature," Jan. 9, 1937 of pneumatically transferring a source of radiation from a safe position, in which it is screened, to an irradiating position, where it is available for use. The principle of the meandering path between safe and irradiating position is also known, which principle was described in Acta Radiologica, vol. XXVIII, 1947 by Sven Benner. This method of achieving movement ensures that when the source is in its safe position, no radiation from the source can escape directly down the tube.

In the past, it has frequently been difficult to ensure that the passage of sources in a meandering path would be free from jamming tendencies. The jamming has been particularly acute when the source has been of considerable length, such as is required for a large uniform irradiation field. It has also been difficult in the past to ensure that an irradiator will "fail-safe."

In the following the teaching of the invention, there is provided an apparatus for irradiating a sample with high energy radiation which comprises, a biological screening mass (normally of lead or heavy metal), a source of high energy radiation (such as a piece of radioactive isotope), said mass defining a storage position for said source, means defining an irradiation position for said source wherein said source may be brought adjacent to the sample to be irradiated, an upwardly extending meandering tube within said mass connecting said storage position with said irradiating position, means for introducing gas to said tube adjacent the storage position for moving said source to and sustaining said source in said irradiation position, said tube being bent so that rays travelling from said source (these would be in straight lines) when in said storage position are compelled to pass through sufficient thickness of biological screening material so that the radiation intensity from the source at the outside of the mass is below a predetermined level (normally arranged to be below a level which would be dangerous to operating personnel). In a preferred embodiment, the irradiation position defining means comprises a tube which is connected to the upper end of the meandering tube and is movable so as to alter the location of the irradiation position. In a further preferred embodiment, there are a plurality of meandering tubes and of tubes connected to the upper ends of these meandering tubes so that the irradiation position of a number of sources can be altered so as to define an irradiation pattern of chosen shape and intensity.

A description of the invention will now be made with reference to the accompanying drawings in which:

FIG. 4 shows further details of the upper portion of the storage apparatus of FIG. 1;

Figure 1:
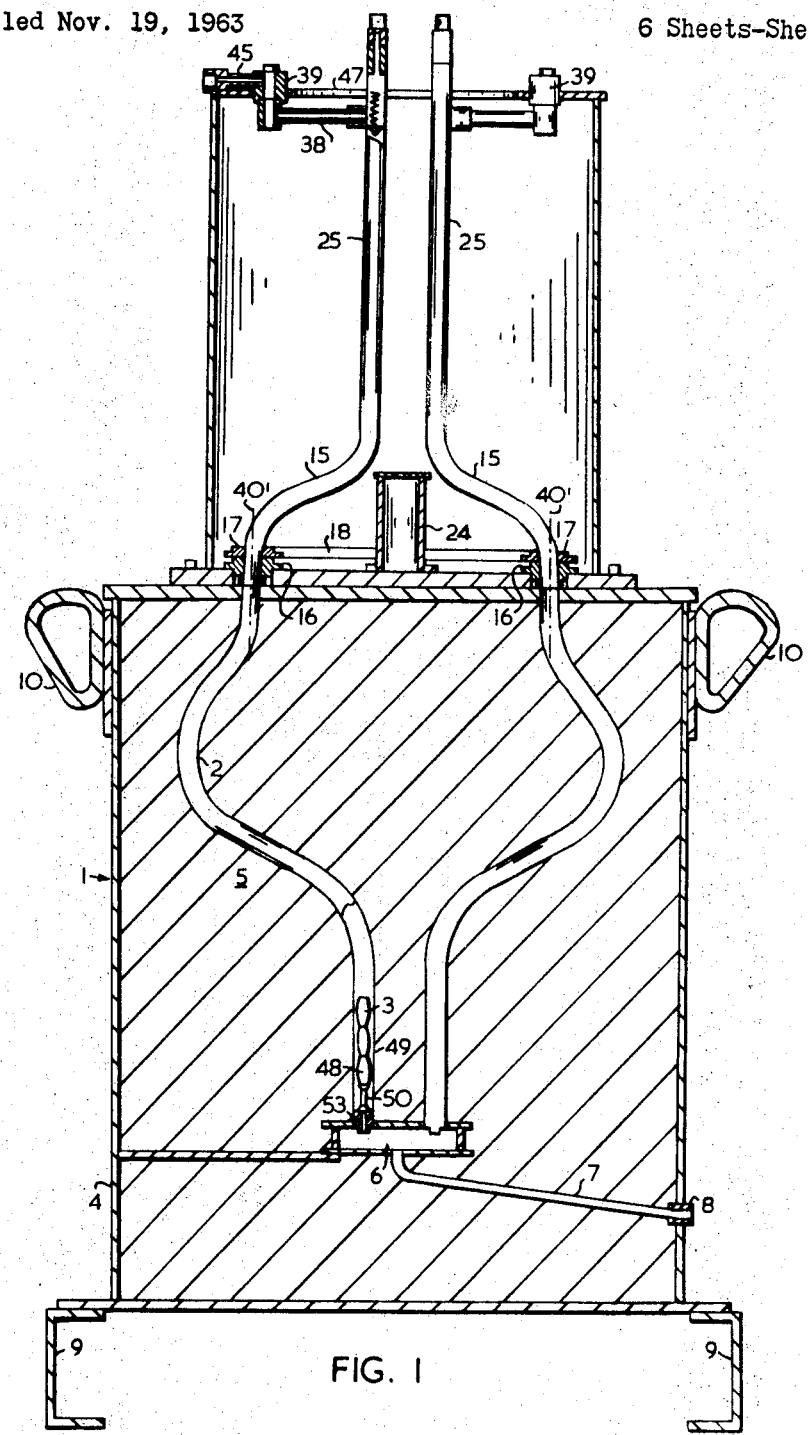
FIG. 1 shows a side view in section of an apparatus constructed in accordance with the teaching of the invention.
Figure 2:
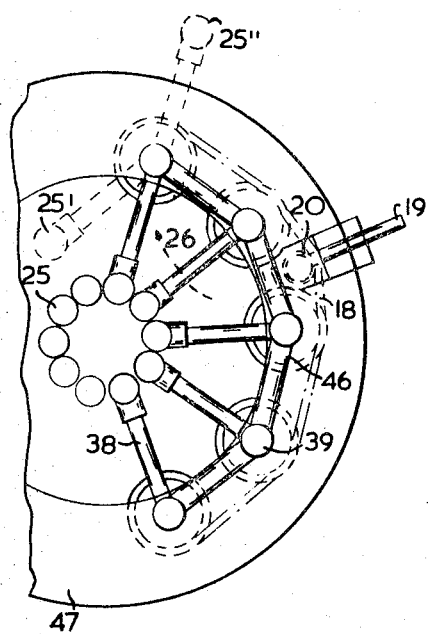
FIG. 2 shows a partial plan view of the apparatus of FIG. 1.

As shown in FIG. 1, the apparatus comprises, a shielding mass 1, preferably of lead or heavy metal within which are a number of meandering tubes 2 containing source capsules 48 of radioactive material 3 such as sheathed $Co^{60}$. For convenience in construction and assembly, the shield 1 consists of a plug 5 which is received within container 4. Container 4 rests on supporting feet 9. For convenience in manipulating lifting lugs 10 are provided for moving the whole assembly with a suitable crane. The meandering tubes 2 of stainless steel are cast into the plug portion 5 when it is being formed. An air space 6, which may comprise a prefabricated plenum chamber, is formed in the plug 5 beneath the lower ends of the tubes 2. A further tube 7, is fed from a coupling 8 adjacent the base of shield 1 and leads into space 6 to provide a flow of air which passes up the meandering tubes 2. Associated with the upper end of each tube 2 at bearings 16 are attached a circumferentially arranged series of curved tube sections 15. The bearings 16 permit rotation of each curved portion 15 about the axis of its tube 2 where it emerges from the upper part of shield 1. The bearings 16 are so constructed that each tube 15 is accurately aligned with its associated tube 2. A chain sprocket 17 is attached to each upper tube 15 and each sprocket is meshed with a chain 18, as shown in FIG. 2, so that they may all be rotated, in synchronism, by a handle 19 carrying a sprocket 20 connected to the chain 18. The uppermost portions of tubes 15 are vertical at 25 and thereby define circumferentially disposed receiving locations for the capsules 48 when in irradiating position. A stand 24 is provided to support samples to be irradiated, within the cylindrical space defined by the tube sections 25.

Figure 3:
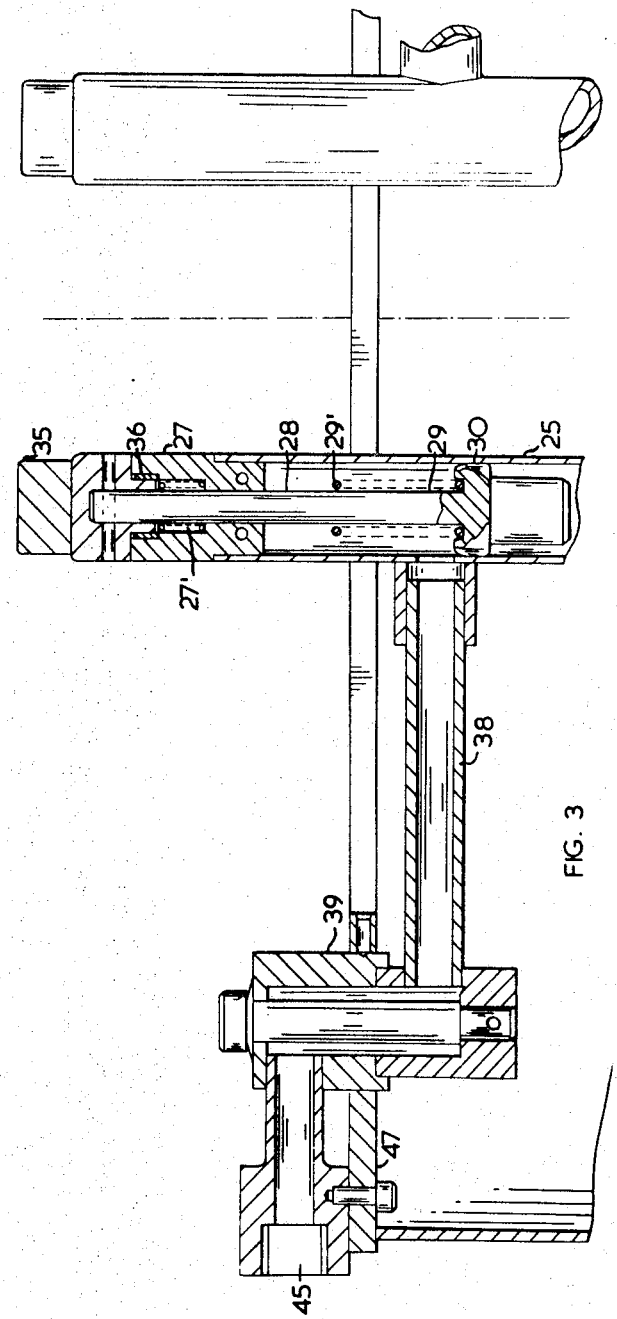
FIG. 3 shows a side-sectional view of the upper portion of the apparatus of FIG. 1.

As can be seen in FIG. 2, movement of the handle 19 allows rotation of tubes 15 in the direction shown by the arrow 26 so that the vertical portions 25 may take up intermediate positions, such as 25', on the surface of a cylinder of a diameter which can be varied and chosen at will. In the outer positions of the tubes 25, shown at 25", i.e. with a large cylinder diameter, the quantity of radiation material entering the tubes 25 is the same as that in the inner positions, and the intensity of irradiation at the sample, is therefore a function of the radius of the cylinder. Thus, the movement of handle 19 allows the radiation intensity on stand 24 to be altered as required. Turning to FIG. 3, mounted within end plugs 27 at the upper ends of tube portions 25 are selector rods 28 having locating discs 30 at their lower ends 29 which permit them to slide freely within the tubes 25. The upper ends of rods 28 carry selector caps 35 which can be threaded into counterbores 36 in end plugs 27 to act as cut-off valves and therefore as safety checks by preventing air flow and retaining the capsules 48 from being moved into irradiating position. When any cap 35 is screwed downwardly into and end plug 27, rod 28 is held down so that disc 30 blocks the escape of air through exhaust pipe 38. The capsules 48 and indicator plug 50 are then unable to rise to the irradiating position. When the selector cap 35 is unscrewed, spring 27' causes the rod 28 to move upwardly, thus allowing air to escape through exhaust pipe 38. Rebound or shock caused by capsules 48 and indicator slugs 50 is absorbed by springs 29'. The air exhaust tube 38 is thus coupled into the upper end of portions 25 and pivots about a bearing 39 mounted directly over the collar 16 in line with the axis 40', about which portions 25 rotate. Air is led away through a duct 45 connected into the manifold 46 which supports each bearing 39 as shown best in FIG. 2. The manifold 46 is mounted on a fixed support ring 47.

Figure 7:
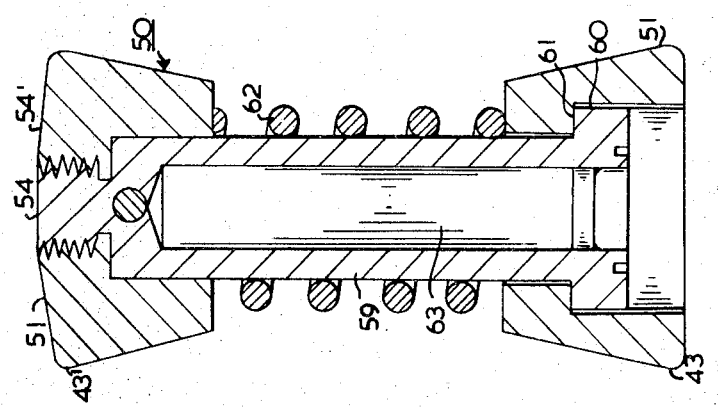
FIG. 7 shows details of the indicator slug assembly.

Returning now to FIG. 1, source capsules 48 are placed in the lower vertical portions 49 of tubes 2. The lowermost capsule 48 is supported by a dumbell-shaped indicator slug 50 which fits loosely within tube 2. Details of the indicator slug are shown in FIG. 7. When put into operation, air is blown into the space 6 through pipe 7, this causes the string of capsules 48 and indicator slugs 50 to be moved into irradiating position occupying the straight part 25 of tube 15.

Figure 5:
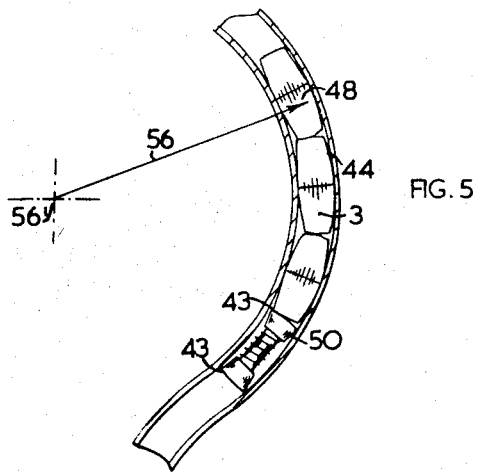
FIG. 5 shows some source capsules together with the end members employed in conjunction with them.
Figure 6:
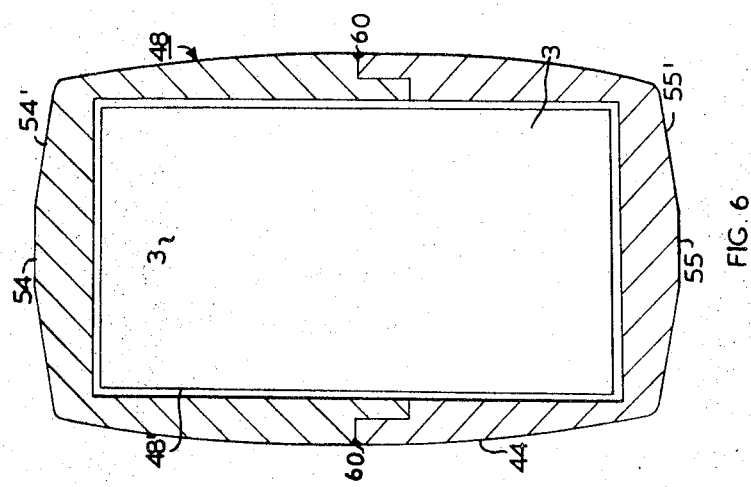
FIG. 6 shows details of the source capsule.
Figure 8:
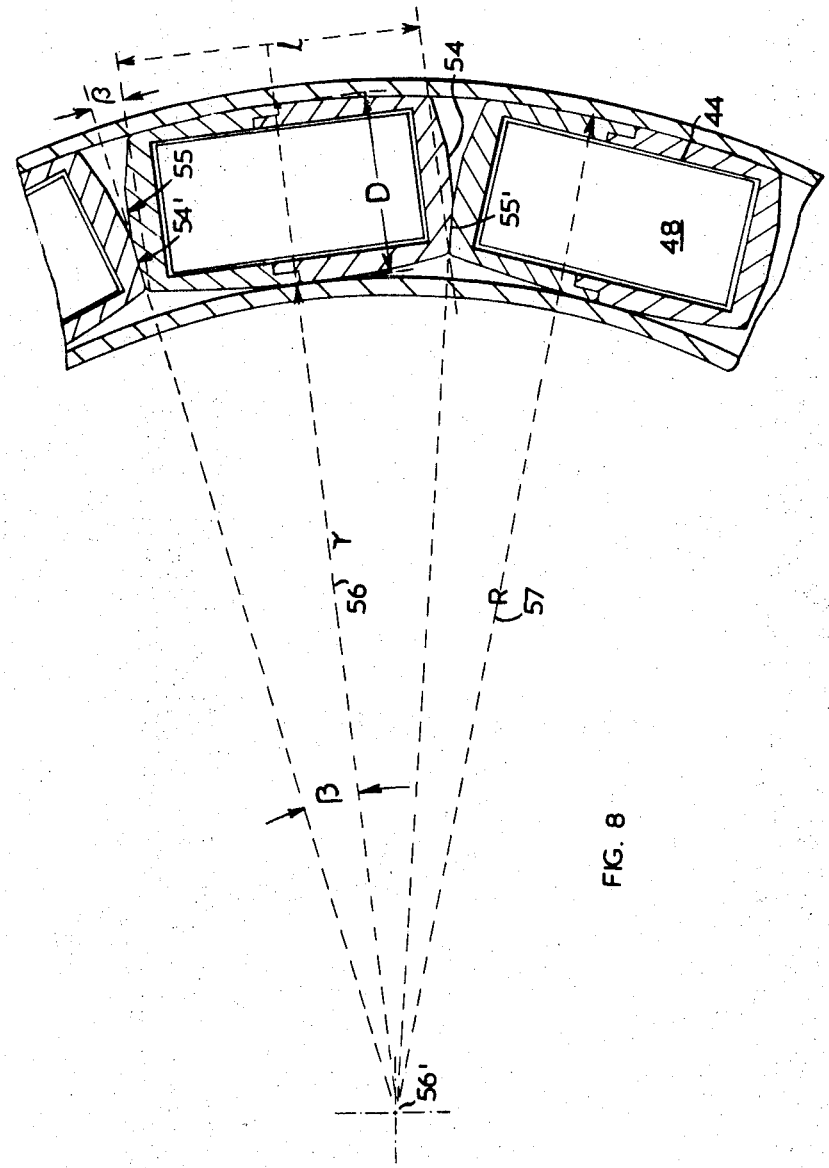
FIG. 8 shows details of the geometry of the capsules.

The structure of the source capsules 48 and of indicator slugs 50 can be seen in greater detail with reference to FIGS. 6, 7 and 8. As shown here, the source capsules 48 are barrel-shaped on their sides and have upper and lower ends 54 and 55 such that there is always line contact between any two capsules or indicator slugs during their excursion through the meandering tubes. The radius of curvature R of the barrel-shaped surfaces is equal to the smallest radius of curvature encountered on the inside of an outside bend of the tube 2. This is shown in FIGS. 5, 6 and 8 where radius 56 is on centre 56', where radius 56 represents the minimum for the tube, and where radius 57, about the same centre, represents that of the surface 44 of the capsule 48. This dimensioning prevents jamming of the sources in the tube since they will always each tend to slide with only one circumferential line in contact with the tube with their ends free from the walls.

The capsule 48, which contains, a radiating material 3, is made in two halves, where the joint occurs on the plane coincident with the maximum diameter. As shown in FIG. 6, one half includes a male spigot and the other half a female counterbore. A V is formed at the outer surface, by chambers on the respective halves. The radiating material 3 is enclosed in an inner capsule 48' and the two halves are welded together after the inner capsule has been placed within the two halves.

The two halves of the capsule each include ends having a flat portion 54 and 55 and angulated portions 54' and 55', determined by angle $\beta$ on FIG. 8. The indicator slugs to be discussed hereinafter, has one similar end. Adjacent capsules or slugs abut one another on associated flat ends, when located in a straight portion of tube. In curved portions of tube, abutment occurs between angulated portions of the respective ends.

The radius of bend of the inside surface, of the most curve portion of a meandering tube is denoted by R, as shown at 57, on FIG. 8.

The outer surface of the capsules is barrel-shaped and has a radius of curvature substantially equal to R, as shown in FIG. 8, and has a maximum diameter of D, where D is very slightly less than the bore of the meandering tube. The length of the curved surface of each capsule, as measured parallel to the axis of generation of the capsule is denoted by "1" in FIG. 8. The diameter of the flat ends 54 and 55 may be varied as convenient. The angle $\beta$, defining the angulated portions 54' and 55' is given by the following expression:

$$\text{Tan } \beta = \frac{1}{2(R-D)}$$

It will be noted that the upper portion 51 of indicator slug 50 is shaped identically to the ends of a capsule to allow line contact during transit. The indicator slug 50 is slightly larger in cross-sectional area that the capsule to ensure that it serves to lift the entire column of sources. The air which passes up the tube exerts a pressure upthrust on indicator slug 50 and bleeds around the dumbell-shaped disc portions 43, past the capsules 48. The maximum outside diameter of capsules 48, i.e. at the broadest part of the barrel, is between 6% and 7% less than the inside diameter of the tube 2. This provides for good flow of leakage air and avoidance of separation of the sources. By preventing the separating of the sources when they are brought into the irradiating position in the vertical tubes 25, there is a single impact as each capsule 48 strikes its rod 28, and thus all of the capsules 48 and indicator slugs 50 are decelerated at the same time and do not hammer against one another. When the capsules 48 are in the irradiating position, it is essential that a continuing flow of air be maintained so that they are suspended in the moving air column. When the air supply through tube 7 is shut off, the sources and indicator slugs 50 fall under gravity to the bottom of tubes 2 against springloaded indicator slug 50, the gas sealing action against the walls of the tube 2 of its projecting disc shoulders 43 prevents indicator slug 50 from dropping more rapidly than the capsules 48 and, therefore, a single impact only occurs between each indicator slug 50 and its pad 53, indicated on FIG. 1.

FIG. 7 shows the indicator slug 50 having a lower disc 43 and upper disc 43'. A hollow sleeve 59 is firmly attached in the upper disc 43' and the opposite end of the sleeve is slidable within the lower disc 43. The lower disc 43 is retained against detachment from the sleeve 59 by a collar 60 formed or attached to the sleeve and cooperating with a counterbore 61 in the disc 43. A shock absorbing spring 62 encloses the sleeve 59 and is adapted to force the upper and lower discs apart. The interior of the sleeve 59 contains a powerful cylindrical magnet 63 which is retained by soldering or other suitable means within the sleeve. The position of the indicator slug within the irradiating apparatus is thus determined by sensing the magnetic field from the slug. A suitable indicator may be a magnetic reed relay, but other sensing devices known to those skilled in the art may be used.

It will noted that the upper portion 51 of the indicator slug 50 is shaped identically to the ends of the capsule 48 to allow line contact during transit. The indicator slug is slightly larger, in cross sectional area, than the capsule to ensure that it serves to lift the entire column of source capsules. The air which passes up the tube exerts a pressure upthrust on the indicator slug 50 and bleeds around the dumbell-shaped disc portions 43, past the capsules 48.

An adjustable leakage valve is preferably provided in the air outlet 45 to regulate the air flow through the tubes 2 so that there is sufficient to maintain the sources in their irradiating position, but not too great a flow to cause them to strike rods 28 unduly smartly when being brought up. The indicator slug 50 does, however, give additional shock resistance by virtue of the spring. The indicator rods 28 serve the additional function of presenting an extra load on the uppermost capsule to ensure that there is a positive returning force acting on the sources besides their weight when the air supply is removed. In some cases, it may be desirable to introduce a stream of air under pressure into outlet 45 to return the elements into mass 1 as an extra means for rapid shut-off of radiation. The capsules 48 comprise radioactive material such as $Co^{60}$, sheathed in an inner casing such as stainless steel or zircaloy, as shown in FIG. 6, and hereinbefore described. The casing is suitably made in two halves and fastened together by a weld running around the periphery of the barrel at seam 60, as shown in FIG. 6. This location protects the weld from the worst of the shock loads and wear. In practice, the weld metal penetration should be at least half the thickness of the sheath and is ground flush with the surface to produce a smooth finish. The outer surface of the capsules 48 are then preferably polished and chromium plated to reduce wear and to improve sliding in the tubes 2 and 25.

We claim:

1. An apparatus for irradiating a sample with high energy radiation which comprises, a biological screening mass, a source of high energy radiation, said mass defining a storage position for said source, means defining an irradiation position for said source wherein said source may be brought adjacent to material to be irradiated, an upwardly extending meandering tube within said mass connecting said storage position with said irradiation position, means for introducing gas to said tube adjacent the storage position for moving said source to and sustaining said source in said irradiating position, said tube being bent so that rays travelling from said source when in said storage position are compelled to pass through sufficient thickness of the biological screening material of said mass that radiation intensity outside said mass is below a predetermined level, said source comprising a hollow capsule having barrel-shaped sides and frusto-conical ends, the barrel-shaped sides of said capsule engaging said tube and having a length "$l$," as measured parallel to the longitudinal axis of said barrel, where length "$l$" is less than the overall length of said capsule, said sides having a maximum diameter "$D$," and a radius of curvature "$R$" measured from a point exterior of said capsule, said frusto-conical ends making an angle $\beta$ with said radius of curvature when said radius of curvature is coincident with said maximum diameter were $$\operatorname{Tan} \beta = \frac{1}{2(R-D)}$$

and indicator means for engagement and movement by said source when entering its irradiation position, said indicator exerting a force on said source when in its irradiation position for impeding further movement of said source under the influence of said sustaining gas, said indicator means comprising a magnetic slug including a hollow sleeve, having a bore closed at one end thereof, a first disc rigidly attached to one end of said sleeve, a second disc slidably received by said sleeve at the other end thereof, means to prevent said second disc from sliding off said sleeve, spring means between said first and second discs adapted to force said discs apart, a magnet adapted to be received in said hollow sleeve and means to retain said magnet within said sleeve.

2. An apparatus for irradiating a sample with high energy radiation which comprises a biological screening mass, a source of high energy radiation, said mass defining a storage position for said source, at least one movable tube defining irradiation position for said source, whereby said irradiation position can be altered while irradiating said sample and can be brought adjacent to material being irradiated, at least one upwardly extending meandering tube within said mass connecting said storage position with said irradiation position, means operatively connected to said movable tube for rotatably moving said movable tube about the axis of the meandering tube where it emerges from the upper part of said mass thereby permitting alteration of the irradiation position while irradiating the sample, bearing means at the upper end of said meandering tube for maintaining said movable tube in alignment with the meandering tube during rotation of said movable tube, means for introducing gas to said meandering tube adjacent the storage position for moving said source to and sustaining said source in said irradiation position, said meandering tube being bent so that rays travelling from said source when in said storage position are compelled to yass through sufficient thickness of the biological screening material of said mass that radiation intensity outside said mass is below a predetermined level.

3. An apparatus as defined in claim 2 comprising a plurality of barrel-shaped sources in said meandering tube.

4. An apparatus as defined in claim 3 comprising indicator means for engagement and movement by said source when entering its irradiation position, said indicator exerting a force on said source when in its irradiation position for impeding further movement of said source under the influence of said sustaining gas, said indicator means comprising a rod extending into said movable tube and means for urging said rod for removing said source from its radiation position.

5. Apparatus as defined in claim 4 comprising adjustable gas bleed means adjacent said irradiation position for controlling the rate of gas flow through said meandering tube means.

6. Apparatus as defined in claim 3 wherein each of said barrel-shaped sources comprises a barrel-shaped capsule, the barrel surface of said capsule engaging said meandering tube, the radius of curvature of said barrel surface in a plane containing the longitudinal axis of the barrel-shaped capsule being less than the minimum radius of concave curvature of the inner surface of the meandering tube in the direction of extension of said meandering tube, at least one end of said capsule being frusto-conical.

7. Apparatus as defined in claim 3 comprising an indicator slug beneath the lowermost of said sources.

8. Apparatus as defined in claim 7 wherein said indicator slug is dumbell-shaped, said slug supporting said sources by gas pressure upon introduction of gas behind said slug through said gas introducing means, said slug being dimensioned with respect to said meandering tube to provide a selected gas leakage past said slug.

9. Apparatus as defined in claim 4 including locking means for said indicator means for preventing entry of said source into its radiation position.

10. A capsule for a source of high energy radiation and adaptable for use with apparatus for irradiating a sample with said high energy source and adaptable to be transported through a meandering tube within a biological screening mass defining a storage position for said source and through a tube defining an irradiation position for said source in said apparatus said meandering tube and tube being operatively connected to each other and said capsule adapted to engage the inner surface of said tubes, said capsule being hollow and having barrel-shaped sides and frusto-conical ends, said barrel-shaped sides having a length "$l$" as measured parallel to the longitudinal axis of said capsule where length "$l$" is less than the overall length of said capsule, said sides having a maximum diameter "$D$" and a radius of curvature "$R$" measured from a point exterior of said capsule, said frusto-conical ends making an angle $\beta$ with said radius of curvature when said radius of curvature is coincident with said maximum diameter, where $$\operatorname{Tan} \beta = \frac{1}{2(R-D)}$$

11. A capsule according to claim 10 wherein said capsule is formed in two parts.

12. A capsule according to claim 11 wherein one of said parts includes a counterbore and the other of said parts includes a male spigot, said counterbore and spigot defining a joint between said two parts.

13. A capsule according to claim 12 wherein each of said parts include a chamfer, said chamfers defining a V after the assembly of said two parts together, said V providing a welding site.

14. A capsule according to claim 11 including an inner capsule, said inner capsule being a completely sealed unit, said inner capsule containing a source of high energy radiation.

15. A magnetic indicator slug adaptable for use in an apparatus for irradiating a sample and adaptable to engage a capsule containing a source of high energy radiation being transported through a meandering tube within a biological screening mass defining a storage position for said source and through a tube defining an irradiation position for said source in said apparatus, said slug comprising:
  (i) a hollow sleeve, having a bore closed at one end thereof,
  (ii) a first disc rigidly attached to one end of said sleeve,
  (iii) a second disc slidably received by said sleeve at the other end thereof,
  (iv) means to prevent said second disc from sliding off said sleeve including a shoulder formed on the outside surface and adjacent the end thereof and said second disc includes a counter-bore to cooperate with said shoulder,
  (v) spring means between said first and second discs adapted to force said discs apart,
  (vi) a magnet adapted to be received in said hollow sleeve, and
  (vii) means to retain said magnet within said sleeve.

16. The slug according to claim 15 wherein a selected one of said first and second discs has an exterior end defined by an outwardly facing frusto-conical surface, said frusto-conical surface including a central flat end normal to the longitudinal axis of said slug.

17. The slug according to claim 15 wherein said means to prevent said second disc from sliding off said sleeve includes a shoulder formed on the outside surface and adjacent the end thereof and said second disc includes a counterbore adapted to cooperate with said shoulder.

18. The slug according to claim 15 wherein said magnet is retained in said sleeve by peening said sleeve.

19. The slug according to claim 15 wherein each of said discs includes an inner face and an outer face, wherein said inner faces are of smaller dimension than said outer face.

References Cited

UNITED STATES PATENTS

| | | | |
|---|---|---|---|
| 2,883,553 | 4/1959 | Birden | 250—845 |
| 3,088,032 | 4/1963 | Brunton | 250—106 |
| 3,121,168 | 2/1964 | Bangs et al. | 250—106 |
| 3,123,713 | 3/1964 | Maud et al. | 250—106 |
| 3,187,239 | 6/1965 | Rosenberger et al. | 335—302 X |

RALPH G. NILSON, Primary Examiner

S. ELBAUM, Assistant Examiner

U.S. Cl. X.R.

206—46; 250—84; 335—302